United States Patent
Farmer et al.

(10) Patent No.: US 11,807,810 B2
(45) Date of Patent: Nov. 7, 2023

(54) MULTI-FUNCTIONAL COMPOSITIONS COMPRISING CONCENTRATED ACIDS FOR ENHANCED OIL AND GAS RECOVERY

(71) Applicant: Locus Solutions IPCo, LLC, Solon, OH (US)

(72) Inventors: Sean Farmer, Ft. Lauderdale, FL (US); Ken Alibek, Solon, OH (US); Karthik N. Karathur, Solon, OH (US); Jonathan Rogers, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

(21) Appl. No.: 17/623,075

(22) PCT Filed: Jun. 25, 2020

(86) PCT No.: PCT/US2020/039486
§ 371 (c)(1),
(2) Date: Dec. 27, 2021

(87) PCT Pub. No.: WO2020/264071
PCT Pub. Date: Dec. 30, 2020

(65) Prior Publication Data
US 2022/0259484 A1    Aug. 18, 2022

Related U.S. Application Data

(60) Provisional application No. 62/866,884, filed on Jun. 26, 2019.

(51) Int. Cl.
| | | |
|---|---|---|
| *E21B 43/27* | (2006.01) | |
| *C09K 8/584* | (2006.01) | |
| *C09K 8/524* | (2006.01) | |
| *E21B 37/06* | (2006.01) | |

(52) U.S. Cl.
CPC ............ *C09K 8/584* (2013.01); *C09K 8/524* (2013.01); *E21B 37/06* (2013.01); *E21B 43/27* (2020.05)

(58) Field of Classification Search
CPC ......... C09K 8/584; C09K 8/524; E21B 43/27; E21B 37/06
See application file for complete search history.

(56) References Cited

U.S. PATENT DOCUMENTS

| | | | |
|---|---|---|---|
| 10,195,160 B2 | 2/2019 | Sonti et al. | |
| 2007/0256836 A1* | 11/2007 | Welton | C09K 8/602 166/305.1 |
| 2008/0257554 A1* | 10/2008 | Zamora | C09K 8/38 166/309 |
| 2011/0263466 A1* | 10/2011 | Rose | C09K 8/528 507/241 |
| 2012/0071367 A1* | 3/2012 | Falana | C09K 8/64 507/203 |
| 2012/0181086 A1* | 7/2012 | Addison | B65D 90/587 175/207 |
| 2012/0213759 A1* | 8/2012 | Karsten | C11D 1/62 424/94.1 |
| 2013/0267446 A1* | 10/2013 | De Wolf | C09K 8/74 507/241 |
| 2014/0305649 A1 | 10/2014 | Tang et al. | |
| 2014/0332212 A1* | 11/2014 | Ayers | C09K 8/58 507/131 |
| 2015/0037302 A1 | 2/2015 | Bralkowski et al. | |
| 2015/0300139 A1* | 10/2015 | Armstrong | C09K 8/685 166/305.1 |
| 2018/0016883 A1* | 1/2018 | Kjølhamar | B09C 1/10 |

FOREIGN PATENT DOCUMENTS

| | | |
|---|---|---|
| KR | 20070066252 A | 6/2007 |
| WO | 2018191172 A1 | 10/2018 |

OTHER PUBLICATIONS

Santos, D., et al., "Biosurfactants: Multifunctional Biomolecules of the 21st Century." International Journal of Molecular Sciences, 2016, 17, 401: 1-31.

* cited by examiner

*Primary Examiner* — Silvana C Runyan
(74) *Attorney, Agent, or Firm* — SALIWANCHIK, LLOYD & EISENSCHENK

(57) ABSTRACT

The subject invention provides multi-functional biochemical compositions, as well as their use in enhancing oil recovery by, for example, enhancing traditional acid treatments. Advantageously, the compositions and methods of the subject invention are operationally-friendly, cost-effective, and environmentally-friendly approaches to enhancing oil recovery. More specifically, in preferred embodiments, the subject invention provides a multi-functional composition for enhanced oil recovery (EOR) comprising one or more concentrated acids that work in synergy with a combination of one or more surfactants, one or more chelating agents, and one or more solvents to stimulate the flow of oil from a formation.

5 Claims, No Drawings

US 11,807,810 B2

MULTI-FUNCTIONAL COMPOSITIONS COMPRISING CONCENTRATED ACIDS FOR ENHANCED OIL AND GAS RECOVERY

CROSS-REFERENCE TO RELATED APPLICATION

This application is a National Stage Application of International Application No. PCT/US2020/039486 filed Jun. 25, 2020; which claims priority to U.S. Provisional Patent Application No. 62/866,884, filed Jun. 26, 2019, both of which are incorporated herein by reference in their entirety.

BACKGROUND OF THE INVENTION

The safe and efficient production of oil and gas depends on the proper functioning of hydrocarbon-producing facilities. One of the most common issues leading to structural failure and production inefficiency within these facilities is the accumulation of deposits in the formation and in and around the wellbore, tubing, flow lines, storage tanks, separators, and other components of oil and gas production infrastructure.

These problematic deposits can be formed by, for example, deposits of precipitated mineral salts, which can arise as a result of, for example, changes in the pressure, composition and/or temperature of the crude oil. Scales can result from precipitates of, for example, barium sulfate, calcium carbonate, strontium sulfate, calcium sulfate, sodium chloride, silicon dioxide, iron sulfide, iron oxides, iron carbonate, silicates, phosphates and oxides, or any of a number of compounds that are insoluble or mildly soluble in water.

Systematic inhibition or removal of deposits is crucial to maintaining properly functioning oil and gas producing facilities. Once even a thin layer of scale deposits on a surface, such as in a formation pore throat, the rate of further accumulation drastically increases. Furthermore, as an oil well ages, deposits become more prevalent due to changes in the environment within the formation and the well. For example, as reservoir pressure drops, oil production decreases, which in turn decreases flow rates. The slowing of flow rates can lead to the buildup of organic deposits in the pores of the formation, thus reducing hydrocarbon movement into the wellbore. This can lead to changes in temperature gradients and thus even greater precipitation of deposits, including scale. Thus, the effects are interrelated, cyclical and compounding, unless they are dealt with consistently.

As the thickness of deposits increases in structures over time, the result is a gradual decrease in production. In tubing and casing structures, the deposits begin to reduce the inner diameter of piping and restrict the free flow of oil and gas. As this occurs, the interior roughness of the structures also increases, which raises the pump pressure required to move the petroleum product. If left untreated, deposits can ultimately lead to complete blockage. Furthermore, depending upon the location of the precipitation, maintenance and/or emergency repairs can become extremely expensive.

Current methods of deposit removal fall within four main categories: mechanical, chemical, microbial, and thermal removal. Mechanical removal typically involves the use of scrapers or cutters to physically remove deposits. In tanks where precipitation has occurred, the sides of the tank must often be cut out and manual force applied using, e.g., a sledgehammer, to remove the deposits. For pipelines, a process called milling can be used, where coiled tubing is run inside tubulars and a variety of chipping bits break away at the deposits. Another process called jetting utilizes water and/or chemical washes. Water jetting can be effective on soft scale, such as halite, but is less effective on some forms of medium to hard scales, such as calcite and barite. The use of abrasives greatly improves cutting through scale, but can damage the steel tubulars and valves. In some instances, complete replacement of pipes is required if deposits become too thick for manual or mechanical removal.

Chemical removal can also be implemented, and often involves the use of acids, solvents or surfactants that can solubilize scale deposits, rust and other debris, or interfere with the crystallization and formation of the deposit particles. Hydrochloric acid, acrylic acid, maleic acid, polymers and phosphonates have been used extensively for scale treatment.

One type of acid treatment, in particular, is known as acidizing, which involves pumping acid into a wellbore or formation to improve the well's productivity. The acid restores the permeability of the formation by dissolving the sediments and mud solids that plug the rock pores, thus enlarging the pores and stimulating the flow of hydrocarbons. The acid can also dissolve formation rock itself to increase permeability.

Another type of acid treatment is known as acid washing, wherein acid is used to dissolve sediments in the tubulars and wellbores of an oil well, rather than the formation. This can be useful for fixing and/or preventing damage to perforations, tubing, and the near-wellbore zone caused by fine particles, mud or cement filtrate, scale and debris from well operations.

While acid treatments can be effective chemical mechanisms for removing and/or inhibiting scale and other deposits in oil wells and formations, acids such as hydrochloric acid, can be costly, particularly in high-heat environments. Hydrochloric acid is especially reactive under these conditions and can cause corrosion of metal equipment, such as the well casing. Organic acids can be used instead due to their slower reaction rates and lower corrosion potential, but they are not suitable for all formation types.

Accumulation of deposits in oil and on oil processing equipment can have a compounding effect. Unless these compounds are removed, operators can be faced with lowering oil recovery rates, improper function of pumps, blocked tubing and pipes, and potential for total loss of production. Cost, safety in processing, large-scale sustainability, and damage to formations must be accounted for when developing methods for removing these deposits to ensure long-term efficiency of hydrocarbon production.

Because of the importance of safe and efficient oil and gas production and the difficulties caused by scale deposits in production and transport of oil and gas, there is a continuing need for improved methods of inhibiting, and/or removing such deposits from, hydrocarbon-producing facilities.

BRIEF SUMMARY OF THE INVENTION

The subject invention provides multi-functional biochemical compositions, as well as their use in enhancing acid treatments in oil wells, wellbores and reservoirs. Advantageously, the compositions and methods of the subject invention provide operationally-friendly, cost-effective, and environmentally-friendly approaches to enhancing oil recovery from an oil-bearing subterranean formation.

More specifically, in preferred embodiments, the subject invention provides a multi-functional composition for enhanced oil recovery (EOR) comprising one or more concentrated acids, one or more surfactants, one or more chelating agents, and one or more solvents. Optionally, one or more co-surfactants are included in the composition in order to enhance its beneficial effects in an oil-bearing formation.

Advantageously, in preferred embodiments, the composition can utilize environmentally-friendly, biodegradable ingredients that work together to stimulate the flow of oil from an oil well. In addition to EOR, the composition is also useful for one or more of the following: dissolving and dispersing scale deposits that have plugged rock pore throats in a formation; removing scale that has deposited onto equipment associated with oil production and processing; sequestering heavy metals present in crude oil fluids; preventing and/or reducing formation of asphaltene agglomerates and/or deposits in oil and on surfaces of equipment associated with a formation; dispersing paraffin deposits; increasing the mobility of crude oil during recovery from a well; and increasing the wettability of formation rock.

In preferred embodiments, the concentrated acid(s) of the subject composition are selected from one or more of hydrochloric acid (HCl), hydrofluoric acid (HF), and/or an organic acid, such as, for example, acetic acid or formic acid. In some embodiments, the type and/or combination of acid types is dependent upon the composition of the subterranean formation, and/or the composition of the scale or other deposits in the well and/or formation.

In certain embodiments, the amount of concentrated acid in the composition is about 1% to about 20% v/v. Preferably, the concentrated acid has a purity of about 80% or greater.

In preferred embodiments, the surfactants of the subject composition comprise biosurfactants or a blend of more than one type of biosurfactant. Biosurfactants useful according to the subject invention include, for example, glycolipids, cellobiose lipids, lipopeptides, fatty acid esters, fatty acid ethers, flavolipids, phospholipids, and high-molecular-weight polymers/biopolymers such as lipoproteins, lipopolysaccharide-protein complexes, and/or polysaccharide-protein-fatty acid complexes. Preferably, the biosurfactants are produced by microorganisms.

In one embodiment, the biosurfactants are one or more glycolipids such as, for example, rhamnolipids (RLP), rhamnose-d-phospholipids, trehalose lipids, trehalose dimycolates, trehalose monomycolates, mannosylerythritol lipids (MEL), cellobiose lipids, ustilagic acids and/or sophorolipids (SLP) (including lactonic forms and/or acidic forms). In one embodiment, the biosurfactants are one or more lipopeptides, such as, for example, surfactin, iturin, fengycin, arthrofactin, viscosin, amphisin, syringomycin, and/or lichenysin. In one embodiment, the biosurfactants are one or more fatty acid esters and/or one or more fatty acid ethers. In one embodiment, the biosurfactants are one or more other types of biosurfactants, such as, for example, cardiolipin, emulsan, lipomanan, alasan, and/or liposan.

In one embodiment, the surfactants can be one or more microbial compounds having physical properties and/or behaviors similar to those of biosurfactants, but which are not commonly known as biosurfactants. These compounds can be fatty acid esters and/or fatty acid ethers. In certain embodiments, the fatty acid compounds can comprise carbon chains with 6 to 22 carbon atoms. In certain embodiments, the fatty acid(s) of the fatty acid compounds are unsaturated.

In certain embodiments, the total surfactant concentration included in the subject composition is less than 5,000 ppm. In certain embodiments, the total surfactant concentration is about 0.01% to about 10%, or about 0.05% to about 5%.

In preferred embodiments, the surfactant concentration is no lower than critical micelle concentration (CMC) at the time the composition is introduced into the formation (e.g., after natural dilution occurs within the formation). Such concentration can be calculated by the skilled artisan having the benefit of the subject disclosure.

In one embodiment, the surfactants of the compositions are obtained through cultivation of microorganisms using processes ranging from small to large scale. The cultivation process can be, for example, submerged cultivation, solid state fermentation (SSF), and/or a combination thereof.

In certain embodiments, the surfactants can be added to the composition in purified form and/or in crude form. In one embodiment, the surfactants can be added to the composition in the form of a microbial fermentation product, containing liquid fermentation broth (supernatant) and, optionally, microbial cells resulting from submerged cultivation of a surfactant-producing microbe. The microbes can be bacteria, yeasts and/or fungi. Preferably, the microbial cells are inactivated prior to being added to the composition.

Advantageously, the surfactants can serve as adjuvants, helping to reduce the total amount of the multifunctional EOR composition required for treatment and helping reduce the time required to achieve the desired results. The surfactants, as adjuvants, increase the penetration of the other active components into the formation and into clogging and contaminating deposits, such as scale. The surfactants can also serve to counteract the potentially corrosive effects of the concentrated acid on, for example, metal equipment, by acting as corrosion inhibitors. The surfactants can also serve as active components for achieving EOR and other beneficial functions in an oil-bearing formation, due to, for example, their surface and interfacial tension reduction properties.

In one embodiment, the chelating agents of the subject composition comprise, for example, EDTA, citric acid, sodium citrate, sodium acetate, or any mixture thereof. In one embodiment, the chelating agents can be added to the composition in amounts of about 5 g/L or more. In a specific embodiment, the chelating agents comprise a mixture of EDTA, sodium citrate, and citric acid.

Advantageously, the chelating agents can help dissolve and/or inhibit scale deposits, can help remove and/or sequester heavy metals, such as nickel and vanadium, from oil, and can reduce asphaltene buildup by forming complexes with heavy metal molecules that can serve as anchors for asphaltene particle agglomeration. Additionally, in some embodiments, the chelating agents can serve as co-surfactants, thus further enhancing the efficiency and potency of the effects of the composition. This is particularly true with the use of EDTA, which can serve as an anionic co-surfactant in some embodiments.

In one embodiment, the solvents of the subject composition are selected from alcohols, ionic and/or semi-ionic liquids, and ammonium hydroxide.

Alcohols according to the subject composition can include, for example, ethanol, butanol, propanol, and/or isopropyl alcohol. In a specific embodiment, the alcohol is isopropyl alcohol at a concentration of about 2 ml/L to 100 ml/L.

Ionic and/or semi-ionic liquids according to the subject composition can include, for example, ethyl ammonium nitrate or glycerin/magnesium sulfate heptahydrate. Advantageously, ionic and/or semi-ionic liquids can be useful in, for example, dissolving asphaltene agglomerates present in crude oil fluids and on equipment. Preferably, the concentration of ionic or semi-ionic liquid is about 0.1% to about 5%.

In some embodiments, the composition comprises ammonium hydroxide as a solvent and/or as a pH adjuster. Preferably, the ammonium hydroxide is present in the composition at a concentration of about 1 ml/L to 50 ml/L.

The subject composition can further comprise other compounds and/or additives, such as, for example, carriers (e.g., water, brine fluids), ammonium salts (e.g., monoammonium phosphate) and/or enzymes (e.g., derived from *Aspergillus* spp.). These additional compounds can be added in amounts ranging from, for example, 0.001% to 80% or greater, by weight or volume.

In one exemplary embodiment, the composition comprises concentrated hydrochloric acid; one or more surfactants; ammonium hydroxide; isopropyl alcohol; a mixture of EDTA, sodium citrate and citric acid; and, optionally, monoammonium phosphate. The components can be mixed together in water or brine fluids.

In one embodiment, the subject invention provides methods for improving oil production. In specific embodiments, the methods provide for enhanced acid washing and/or acidizing treatments, wherein one or more concentrated acids, as well as one or more surfactants, one or more chelating agents, and one or more solvents, are applied into a formation and/or an oil well and/or wellbore associated therewith. Optionally, one or more co-surfactants are also applied.

In one embodiment, the methods comprise applying a multipurpose EOR composition of the subject invention to the formation, well and/or wellbore. Advantageously, the methods can be used to enhance oil recovery from a well that has experienced a decline in oil production rates, including depleted stripper (marginal) wells.

Application of the multipurpose EOR composition can be performed during drilling operations (e.g., while drilling, while tripping-in or tripping-out of the hole, while circulating mud, while casing, while placing a production liner, and/or while cementing, etc.). Application can also occur as a production treatment, for example, by introducing the composition into an oil well after oil production is underway and/or after a decline in the rate of oil production from the formation has occurred.

In some embodiments, the composition can be introduced into the formation through perforations in the casing. The composition may be forced into the surrounding formation by applied pressure or, if the composition is allowed to set at the bottom of the casing, the composition may seep into the formation without additional pressure. The composition permeates the formation, improving the rate of oil recovery by, for example, dissolving blockages in the formation pore throats.

Advantageously, the methods are useful for a variety of functions in addition to EOR, including improving the quality of crude fluids, and maintenance of oil production and processing equipment. In some embodiments, these functions are interrelated.

In some embodiments, the methods result in EOR through, for example, stimulation of the flow of oil from an oil well; prevention and/or reduction of asphaltene agglomeration in oil and/or deposition on equipment surfaces; dispersal of paraffin deposits; increase in the mobility of crude oil during recovery; and increase in the wettability of formation rock.

Furthermore, in some embodiments, the concentrated acid(s) work in synergy with the one or more surfactants, one or more chelating agents, one or more solvents, and/or one or more optional co-surfactants, to dissolve and/or disperse mineral scale deposits that have deposited in, for example, tubulars or the wellbore, and/or that have plugged formation rock pore throats. In certain embodiments, this synergy provides for enhanced acid treatments, meaning the treatment is more effective for stimulating the flow of oil from a formation than using concentrated acids alone.

In one embodiment, improved crude oil quality is achieved through the sequestration and/or removal of heavy metals, such as nickel and/or vanadium, present in crude oil; reduction and/or prevention of asphaltene agglomerates in the oil; and modulation of the pH of the oil.

In certain embodiments, the methods are also useful for maintenance of equipment, for example, pipes, tubulars, drills, pumps, casings, tanks, rods, boreholes, and other structures and equipment involved in oil and/or gas production and processing. Any equipment or component of oil production, processing, transportation, storage and/or refining can be treated and maintained with a composition of the subject invention.

In one embodiment, maintenance of equipment is achieved through the prevention, removal, and/or dispersal of contaminating deposits, such as scale, paraffins and asphaltenes, which form on the equipment. In certain embodiments, this also serves to prevent under-deposit corrosion of equipment.

Advantageously, in some embodiments, the subject treatments can free clogged pores, channels and/or tubing, and/or reduce the capillary pressure in a formation, thus allowing for increased oil production from depleted wells, and further, even allowing inoperable wells to resume normal operation. Additionally, through a variety of mechanisms, the subject treatments can stimulate wells, improve the quality of crude oil, and help in the maintenance of oil production and processing equipment.

DETAILED DESCRIPTION

The subject invention provides multi-functional biochemical compositions, as well as their use in enhancing oil recovery from an oil-bearing formation. In certain embodiments, the subject invention provides enhanced acid treatments in oil wells, wellbores and reservoirs. Advantageously, the compositions and methods of the subject invention provide operationally-friendly, cost-effective, and environmentally-friendly approaches to enhancing oil recovery.

In preferred embodiments, the subject invention provides a multi-functional composition for enhanced oil recovery (EOR) comprising one or more concentrated acids, one or more surfactants, one or more chelating agents, and one or more solvents. Optionally, one or more co-surfactants are included in the composition in order to enhance its beneficial effects in an oil-bearing formation.

In one embodiment, the subject invention provides efficient methods for improving oil production. In certain embodiments, the methods are used for enhancing acid washing and/or acidizing treatments of oil wells, wellbores, and/or subterranean formations.

In one embodiment, the methods comprise introducing a multipurpose FOR composition of the subject invention into an oil-bearing subterranean formation. Advantageously, the methods can be used to enhance oil recovery from a well that has experienced a decline in oil production rates, including depleted stripper (marginal) wells.

SELECTED DEFINITIONS

As used herein, "contaminant" refers to any substance that causes another substance or object to become fouled, clogged and/or impure. Contaminants can be living or non-living and can be inorganic or organic substances or deposits. Furthermore, contaminants can include, but are not limited to, scales, hydrocarbons, such as petroleum, tar or asphaltenes; fats, oils and greases (FOG); lipids; waxes, such as paraffins; resins; heavy metals; biofilms; or any other substances referred to as, for example, dirt, dust, sludge, crud, slag, grime, scum, plaque, buildup, or residue. Reference to "scale" means any type of scale that results from the precipitation of, for example, barium sulfate, calcium carbonate, calcium sulfate, calcium oxalate, magnesium hydroxide, magnesium oxide, silicates, strontium sulfate, aluminum oxide hydroxides, aluminosilicates, magnetite or nickel ferrite, sodium chloride, silicon dioxide, iron sulfide, iron oxides, iron carbonate, copper, phosphates, oxides, and any other mineral compound that can precipitate and form deposits.

As used herein, a "heavy metal" is a chemical element with a specific gravity at least five times that of water. Examples of heavy metals include, but are not limited to, arsenic, cadmium, chromium, copper, iron, lead, manganese, mercury, nickel, vanadium and zinc. Many heavy metals are present in crude oil fluids, and can corrode equipment as well as poison the catalysts used in fluid catalytic cracking and oil refineries. Furthermore, heavy metals can serve as anchors for the agglomeration of, for example, asphaltene particles, which can accumulate, leading to a reduction in crude oil quality and the formation of deposits on equipment surfaces.

As used herein, "cleaning" as used in the context of contaminants means removal or reduction of contaminants from a surface or a piece of equipment. Cleaning can include treating, purifying, defouling, decontaminating, clearing or unclogging, and can be achieved by any means, including but not limited to, melting, dispersing, emulsifying, dissolving, scraping, degrading, blasting, soaking, or cleaving the contaminant.

As used herein, "prevention" means avoiding, delaying, forestalling, inhibiting or minimizing the onset or progression of an occurrence or situation. Prevention can include, but does not require, absolute or complete prevention, meaning the occurrence or situation may still develop at a later time and/or with a lesser severity than it would without preventative measures. Prevention can include reducing the severity of the onset of an occurrence or situation, and/or inhibiting the progression thereof to one that is more severe. In certain embodiments, the subject invention can be useful for, for example, preventing the crystallization, deposition and/or re-deposition of scale, paraffins and/or asphaltenes.

As used herein, reference to a "microbe-based composition" means a composition that comprises components that were produced as the result of the growth of microorganisms or other cell cultures. Thus, the microbe-based composition may comprise the microbes themselves and/or by-products of microbial growth. Preferably, the compositions according to the subject invention comprise inactivated microbes, or have been separated from the microbes altogether. The by-products of microbial growth may be, for example, metabolites (e.g., biosurfactants), cell membrane components, expressed proteins, and/or other cellular components.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, an "isolated" or "purified" nucleic acid molecule, polynucleotide, polypeptide, protein or organic compound, such as a small molecule, is substantially free of other compounds, such as cellular material, with which it is associated in nature. In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 25%, 50%, 75%, or 100%.

As used herein, "reference" means a standard or control condition.

A "metabolite" refers to any substance produced by metabolism (e.g., a growth by-product) or a substance necessary for taking part in a particular metabolic process. A metabolite can be an organic compound that is a starting material, an intermediate in, or an end product of metabolism. Examples of metabolites include, but are not limited to, biosurfactants, enzymes, acids, solvents, gasses, alcohols, proteins, vitamins, minerals, microelements, amino acids, and polymers.

As used herein, "surfactant" means a compound that lowers the surface tension (or interfacial tension) between two liquids, between a liquid and a gas, or between a liquid and a solid. Surfactants act as, e.g., detergents, wetting agents, emulsifiers, foaming agents, and/or dispersants. A "biosurfactant" is a surface-active substance produced by a living cell.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Compositions

In preferred embodiments, the subject invention provides multi-functional compositions for enhanced oil recovery (EOR). More specifically, in preferred embodiments, the subject invention provides a multi-functional FOR composition comprising one or more concentrated acids, one or more surfactants, one or more chelating agents, and one or more solvents. Optionally, one or more co-surfactants are included in the composition in order to enhance its beneficial effects in an oil-bearing formation.

Advantageously, in preferred embodiments, the composition can comprise environmentally-friendly, biodegradable ingredients that work together to stimulate the flow of oil from an oil well. Furthermore, the composition can be useful for enhancing acid treatments, such as acidizing and/or acid washing, in formations, oil wells, wellbore, and/or other associated equipment.

In addition to EOR, the composition is also useful for one or more of the following: dissolving and dispersing scale deposits that have plugged rock pore throats in a formation; removing scale that has deposited onto equipment associated with oil production and processing; sequestering heavy metals present in crude oil fluids; preventing and/or reducing formation of asphaltene agglomerates and/or deposits in oil and on surfaces of equipment associated with a formation; dispersing paraffin deposits; increasing the mobility of crude oil during recovery from a well; and increasing the wettability of formation rock.

In preferred embodiments, the concentrated acid(s) of the subject composition comprise one or more of hydrochloric acid (HCl), hydrofluoric acid (HF), and/or an organic acid, such as, for example, acetic acid or formic acid. Preferably, the concentrated acid and/or acids are concentrated to a purity of at least 80%, at least 90%, at least 95%, or at least 98%.

In some embodiments, the type and/or combination of acid types is dependent upon the geologic composition of the subterranean formation, and/or the composition of the scale or other deposits in the well and/or formation. For example, in some embodiments, HCl is used when the formation comprises carbonate reservoirs, or limestones and dolomites. HF can be useful for dissolving quartz, sand and clay from reservoir rocks. In some embodiments, a combination of acids is used because, for example, the formation is heterogeneous in its geologic composition.

In certain embodiments, the amount of concentrated acid in the composition is about 1% to about 20% v/v, about 5% to about 15%, or about 7.5% to about 10%.

In preferred embodiments, the surfactants of the subject composition comprise microbial-produced compounds having surface and interfacial tension reducing properties. Advantageously, the surfactants can serve as adjuvants by increasing the penetration of the other active components into the formation and into clogging and contaminating deposits, such as scale. This helps to reduce the total amount of the multifunctional EOR composition required for treatment and helps reduce the time required to achieve the desired results.

The surfactants can also serve to counteract the potentially corrosive effects of the concentrated acid on, for example, metal equipment, by acting as corrosion inhibitors. Furthermore, the surfactants can also serve as active components for achieving EOR and other beneficial functions in an oil-bearing formation, due to, for example, their surface and interfacial tension reduction properties.

In certain embodiments, the surfactants are microbial biosurfactants or a blend of more than one type of biosurfactant. Biosurfactants are a structurally diverse group of surface-active substances produced by microorganisms. Biosurfactants are biodegradable and can produced using selected organisms in or on renewable substrates. All biosurfactants are amphiphiles consisting of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces. Furthermore, biosurfactants accumulate at interfaces, and reduce the surface and interfacial tension between the molecules of liquids, solids, and gases, thus leading to the formation of aggregated micellar structures in solution.

Biosurfactants according to the subject invention include, for example, glycolipids, cellobiose lipids, lipopeptides, fatty acid ester compounds, fatty acid ether compounds, flavolipids, phospholipids, and high-molecular-weight polymers/biopolymers such as lipoproteins, lipopolysaccharide-protein complexes, and/or polysaccharide-protein-fatty acid complexes. Preferably, the biosurfactants are produced by microorganisms In one embodiment, the biosurfactants can be one or more glycolipids such as, for example, rhamnolipids, rhamnose-d-phospholipids, trehalose lipids, trehalose dimycolates, trehalose monomycolates, mannosylerythritol lipids, cellobiose lipids, ustilagic acid and/or sophorolipids.

In an exemplary embodiment, the surfactant is a sophorolipid (SLP). The SLP can be an esterified SLP, a lactonic form SLP, and/or an acidic form SLP. Further included are mono-acetylated SLP, di-acetylated SLP, SLP with varying hydrophobic chain lengths, SLP with fatty acid-amino acid complexes attached, and others as are described within in this disclosure. In some embodiments, a mixture of SLP types is utilized.

In preferred embodiments, the SLP molecules according to the subject invention are represented by General Formula (1) and/or General Formula (2), and are obtained as a collection of 30 or more types of structural homologues having different fatty acid chain lengths ($R^3$), and, in some instances, having an acetylation or protonation at $R^1$ and/or $R^2$.

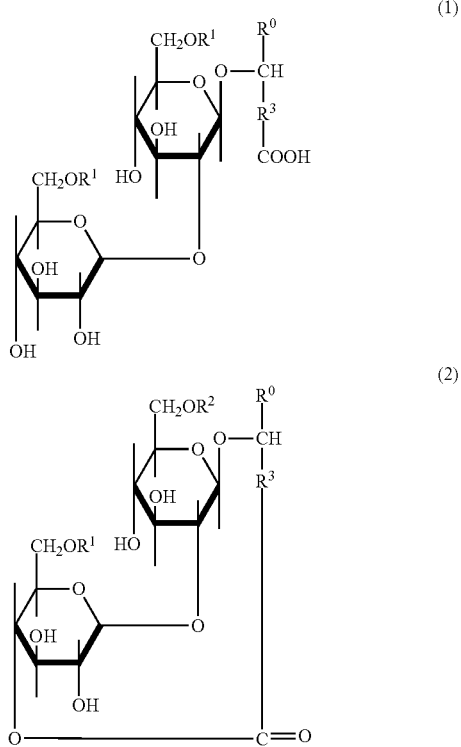

In General Formula (1) or (2), $R^0$ can be either a hydrogen atom or a methyl group. $R^1$ and $R^2$ are each independently a hydrogen atom or an acetyl group. $R^3$ is a saturated aliphatic hydrocarbon chain, or an unsaturated aliphatic hydrocarbon chain having at least one double bond, and may have one or more Substituents.

Examples of the Substituents include halogen atoms, hydroxyl, lower (C1-6) alkyl groups, halo lower (C1-6) alkyl groups, hydroxy lower (C1-6) alkyl groups, halo lower (C1-6) alkoxy groups, and the like. $R^3$ typically has 11 to 20 carbon atoms, preferably 13 to 17 carbon atoms, and more preferably 14 to 16 carbon atoms. Examples of the halogen atoms or halogen atoms bound to alkyl groups or alkoxy groups include fluorine, chlorine, bromine, and iodine.

In an exemplary embodiment, the surfactant is a mannosylerythritol lipid (MEL), comprising either 4-O-B-D-mannopyranosyl-meso-erythritol or 1-O-B-D-mannopyranosyl-meso-erythritol as the hydrophilic moiety, and fatty acid groups and/or acetyl groups as the hydrophobic moiety. One or two of the hydroxyls, typically at the C4 and/or C6 of the mannose residue, can be acetylated. Furthermore, there can be one to three esterified fatty acids, from 8 to 12 carbons or more in chain length.

MEL molecules can be modified, either synthetically or in nature. For example, MEL can comprise different carbon-length chains or different numbers of acetyl and/or fatty acid groups.

MEL molecules and/or modified forms thereof according to the subject invention can include, for example, tri-acylated, di-acylated, mono-acylated, tri-acetylated, di-acetylated, mono-acetylated and non-acetylated MEL, as well as stereoisomers and/or constitutional isomers thereof.

In certain specific embodiments, the MEL molecules are selected from members of the following groups: MEL A (di-acetylated), MEL B (mono-acetylated at C4), MEL C (mono-acetylated at C6), MEL D (non-acetylated), tri-acetylated MEL A, tri-acetylated MEL B/C, and further including all possible isomers of the members of these groups.

Other MEL-like molecules that exhibit similar structures and similar properties, can also be produced according to the subject invention, e.g., mannosyl-mannitol lipids (MML), mannosyl-arabitol lipids (MAL), and/or mannosyl-ribitol lipids (MRL).

In one embodiment, the biosurfactants can be one or more lipopeptides, such as, for example, surfactin, iturin, fengycin, arthrofactin, viscosin, amphisin, syringomycin, and/or lichenysin.

In one embodiment, the biosurfactants can be one or more other types of biosurfactants, such as, for example, cardiolipin, emulsan, lipomanan, alasan, and/or liposan.

In one embodiment, the surfactants can comprise one or more microbial-produced fatty acid ester compounds having physical properties and/or behaviors similar to those of biosurfactants, but which are not commonly known as biosurfactants.

In certain embodiments, the fatty acid ester compounds can be represented by the following formula:

wherein
Z=O
$R_1$=$C_6$ to $C_{22}$ saturated or unsaturated hydrocarbon, or an epoxide, or cyclopropane thereof
$Y_1$=H, $C_1$-$C_5$ hydrocarbon, or hydroxyl at any position along $R_1$
$Y_2$=H, $C_1$-$C_5$ hydrocarbon, or hydroxyl at any position along $R_1$
$R_2$=$C_1$-$C_{10}$ saturated or unsaturated, branched or unbranched, hydrocarbon.

In certain embodiments, the fatty acid ester compounds can include, for example, highly esterified oleic fatty acids, such as oleic fatty acid ethyl esters and/or oleic fatty acid methyl esters (FAME).

In one embodiment, the surfactants can comprise one or more microbial-produced fatty acid ether compounds having physical properties and/or behaviors similar to those of biosurfactants, but which are not commonly known as biosurfactants.

In certain embodiments, the fatty acid ether compounds can be represented by the following formula:

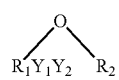

wherein
$R_1$=$C_6$ to $C_{22}$ saturated or unsaturated hydrocarbon, or an epoxide, or cyclopropane thereof $Y_1$=H, $C_1$-$C_5$ hydrocarbon, or hydroxyl at any position along $R_1$ $Y_2$=H, $C_1$-$C_5$ hydrocarbon, or hydroxyl at any position along $R_1$ $R_2$=$C_1$-$C_{10}$ saturated or unsaturated, branched or unbranched, hydrocarbon.

In certain embodiments, the fatty acid ether comprises a vinyl ether or a divinyl ether.

The surfactants can be used at relatively low concentrations. In certain embodiments, the total surfactant concentration included in the subject composition is 5,000 ppm or less, 4,000 ppm or less, or 3,000 ppm or less. In a specific embodiment, the total surfactant concentration is about 2,500 ppm.

In certain embodiments, the total surfactant concentration is about 0.01% to about 10% v/v, about 0.05% to about 5%, about 0.1% to about 1%, or about 0.5% to about 0.75%. In preferred embodiments, the surfactant concentration is no lower than critical micelle concentration (CMC) at the time the composition is introduced into the formation (e.g., after natural dilution occurs within the formation). Such concentration can be calculated by the skilled artisan having the benefit of the subject disclosure.

In one embodiment, the surfactants of the compositions are obtained through cultivation of microorganisms using processes ranging from small to large scale. The cultivation process can be, for example, submerged cultivation, solid state fermentation (SSF), and/or a combination thereof.

In one embodiment, the subject invention provides methods of producing a microbial metabolite by cultivating a microbe strain of the subject invention under conditions appropriate for growth and metabolite production; and, optionally, purifying the metabolite. In specific embodiments, the metabolite is a surfactant growth by-product, preferably, a biosurfactant or an esterified oleic fatty acid.

The microbial growth by-product produced by the microorganisms of interest may be retained in the microorganisms or secreted into the liquid medium. Thus, in one embodiment, a microbe-based product of the subject invention comprises simply the fermentation broth containing microbial metabolites produced by a microorganism and/or any residual nutrients. The product of fermentation may be used directly without extraction or purification. In another embodiment, the method for producing microbial growth by-product may further comprise steps of concentrating and purifying the microbial growth by-product of interest. Thus, the composition may comprise microbial metabolites, e.g., microbial surfactants, in purified form.

In certain embodiments, the surfactants can be added to the multifunctional EOR composition in purified form and/or in crude form. In one embodiment, the surfactants can be added to the composition in the form of a microbial fermentation product, containing liquid fermentation broth (supernatant) and, optionally, microbial cells resulting from submerged cultivation of a surfactant-producing microbe. The microbes can be bacteria, yeasts and/or fungi. Preferably, the microbial cells are inactivated prior to being added to the composition.

In certain embodiments the microorganisms can be, for example, *Arthrobacter* spp.; *Bacillus* spp. (*B. subtilis*, *B. pumillus*, *B. lichenformis*, *B. amyloliquefaciens*, *B. megaterium*, *B. cereus*); *Campylobacter* spp.; *Candida* spp. (e.g., *C. albicans*, *C. rugosa*, *C. tropicalis*, *C. lpolytica*, *C. torulopsis*); *Cornybacterium* spp.; *Flavobacterium* spp.; *Pichia* spp. (e.g., *P. anomala*, *P. guilliermondii*, *P. occidentalis*); *Pseudomonas* spp. (e.g., *P. aeruginosa*, *P. chlororaphis*, *P. putida*, *P. florescens*, *P. fragi*, *P. syringae*); *Pseudozyma* spp. (e.g., *P. aphidis*); *Rhodococcus* spp. (e.g., *R. erythropolis*); *Starmerella* spp. (e.g., *S. bombicola*, *S. apicola*); *Ustilago* spp. (e.g., *U. maydis*); *Wickerhamomyces* spp. (e.g., *W. anomalus*), and others as are described elsewhere in the present description.

In preferred embodiments, the multi-functional EOR composition further comprises one or more chelating agents or chelators. As used herein, "chelating agents," or "chelators" are active complex ion-forming agents capable of removing a metal ion from a system by forming a complex so that the metal ion, for example, cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium acetate, sodium citrate and citric acid. In one embodiment, a mixture of chelators is used.

In a specific embodiment, the chelating agents comprise a mixture of EDTA, sodium citrate, and citric acid. The total concentration of chelating agents can be, for example, about 1 g/L to about 20 g/L or more, about 2.5 g/L to about 15 g/L, or about 5 g/L to about 10 g/L.

Advantageously, the chelating agents can help dissolve and/or inhibit scale, paraffin and/or asphaltene deposits, can help remove and/or sequester heavy metals, such as nickel and vanadium, from oil, and can reduce asphaltene buildup by forming complexes with heavy metal molecules that can serve as anchors for asphaltene particle agglomeration.

Additionally, in some embodiments, the chelating agents can serve as co-surfactants, further enhancing the efficiency and potency of the effects of the composition. For example, chelating agents, such as EDTA, can take on a negative charge, thus enhancing descaling by sequestering positively charged ions, such as calcium ions, as well as inhibiting future scale deposition. In a specific embodiment, the EDTA serves as a particularly effective anionic co-surfactant.

In preferred embodiments, the multi-functional FOR composition further comprises one or more solvents selected from alcohols, ionic and/or semi-ionic liquids, and ammonium hydroxide.

Alcohols according to the subject composition can include, for example, ethanol, butanol, propanol, and/or isopropyl alcohol. In a specific embodiment, the alcohol is isopropyl alcohol at a concentration of about 1 ml/L to about 100 ml/L, about 2 ml/L to about 50 ml/L, or about 4 ml/L to about 25 ml/L of the compositions.

In some embodiments, the composition further comprises an ionic liquid as a solvent. Ionic liquids can act as co-solvents and can prevent the formation of ring bonds in hydrocarbon compositions, which is one cause of hydrocarbon precipitation. Ionic liquids can also prevent and/or reduce the formation and deposition of asphaltene particles.

Ionic liquids are composed entirely of ions, which can include cations, anions and/or a combination thereof. Many ionic liquids are in the form of organic salts with melting points below 100° C., or often even lower than room temperature. The most common ionic liquids are those prepared from organic-based cations and inorganic or organic anions. At least one ion has a delocalized charge and one component is organic, which prevents the formation of a stable crystal lattice. Ionic liquids may be suitable, for example, for use as catalysts and solvents in alkylation and polymerization reactions, as well as in dimerization, oligomerization acetylation, metatheses and copolymerization reactions. Properties of ionic liquids, such as melting point, viscosity and solubility are determined by the substituents on the organic component and by the counter-ion.

Exemplary ionic liquids suitable for the subject composition include, but are not limited to, ethyl ammonium nitrate or glycerin/magnesium sulfate heptahydrate. Preferably, the concentration of ionic liquid in the composition is about 0.01% to about 10%, or about 0.1% to about 5%.

In some embodiments, the composition can further comprise ammonium hydroxide (e.g., a 70% solution) as a solvent. Preferably, ammonium hydroxide is present in the composition at a concentration of about 1 ml/L to 50 ml/L, about 2 ml/L to about 25 ml/L, or about 3 ml/L to about 10 ml/L.

Advantageously, ammonium hydroxide can also serve as a pH adjuster. The ammonium hydroxide balances the pH of the composition towards, or at, a neutral pH (e.g., about pH 6 to 8). This can be useful for improving the acid number of crude oil recovered from the treated formation, as well as for preventing the corrosion of equipment due to contact with the concentrated acids.

In some embodiments, the composition further comprises salts and/or mineral salts selected from phosphorous, magnesium, potassium, glucose and ammonium. For example, ammonium phosphate, monoammonium phosphate, diammonium phosphate, ammonium chloride, or another dibasic or monobasic salt can be included at a concentration of about 1 g/L to about 20 g/L, or about 2 g/L to about 10 g/L. In a specific embodiment, the salt is monoammonium phosphate.

In one exemplary embodiment, the composition comprises water and/or brine and: concentrated hydrochloric acid; one or more surfactants; ammonium hydroxide; isopropyl alcohol; a mixture of EDTA, sodium citrate and citric acid; and, optionally, monoammonium phosphate. In a specific embodiment, the one or more surfactants comprise MEL and/or SLP. In another embodiment, the one or more surfactants comprise esterified oleic fatty acids.

The subject composition can comprise further additives. The additives can be, for example, carriers, buffers, other microbe-based compositions produced at the same or different facility, viscosity modifiers, preservatives, tracking agents, biocides, enzymes, surfactants, emulsifying agents, lubricants, solubility controlling agents, pH adjusting agents, stabilizers, ultra-violet light resistant agents, and/or other ingredients specific for an intended use.

The further additives can be added in amounts ranging from, for example, 0.001% to 80% or greater, by weight or volume, as needed, or up to about 50% by weight or more.

In one embodiment, the components of the de-scaling composition are mixed together in a carrier comprising water or brine fluids.

In one embodiment, the composition may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

In one embodiment, additional components such as an aqueous preparation of a salt such as sodium bicarbonate or carbonate, sodium sulfate, sodium phosphate, sodium biphosphate, can be included in the formulation.

The compositions according to the subject invention can comprise ingredients in amounts effective to enhance oil and/or gas recovery from a formation; as well as to perform the additional functions described herein related to improving the quality of oil recovered from the formation, as well as maintenance of equipment associated with the formation.

In some embodiments, the multifunctional composition of the subject invention has advantageous electrostatic properties that provide for enhanced oil recovery. In general, each ingredient can have a pH-dependent partial charge. The surfactants comprise non-ionic and/or anionic fractions. The non-ionic fractions are necessary for interacting with the oil phase, as opposed to the water phase, of crude fluids.

Additionally, certain chelating agents can take on a negative charge. Along with the anionic surfactants, the chelating agents can serve as co-surfactants to help enhance penetration into the formation and into scale deposits through the sequestering of positively charged ions (e.g., calcium ions) without the need for using strong acids. This also helps with inhibiting future deposition of scale.

Furthermore, the composition does not react with chlorine or organic chlorine complexes, and does not dissociate as easily as, for example, compounds used in acid scale removal, such as potassium hydroxide or hydrochloric acid, which are highly electrolytic.

Production of Microbial Growth By-Products

The subject invention provides methods for cultivation of microorganisms and production of microbial metabolites and/or other by-products of microbial growth (e.g., biosurfactants, fatty acid esters). In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

In one embodiment, the subject invention provides methods of producing a microbial metabolite by cultivating a microbe strain of the subject invention under conditions appropriate for growth and production of the metabolite. In a specific embodiment, the metabolite is a surfactant according to the subject invention. The metabolite may also be, for example, ethanol, lactic acid, beta-glucan, proteins, amino acids, peptides, metabolic intermediates, polyunsaturated fatty acids, and lipids. The metabolite content produced by the method can be, for example, at least 20%, 30%, 40%, 50%, 60%, 70%, 80%, or 90%.

In some embodiments, a microorganism produces more than one surfactant and/or other growth by-products at a time.

In certain embodiments, a microbe growth facility produces fresh, high-density microorganisms and/or microbial growth by-products of interest on a desired scale. The microbe growth facility may be located at or near the site of application, or at a different location. The facility produces high-density microbe-based compositions in batch, quasi-continuous, or continuous cultivation.

In certain embodiments, the microbe growth facilities of the subject invention can be located at or near the location where the microbe-based product will be used (e.g., at or near an oil well). For example, the microbe growth facility may be less than 300, 250, 200, 150, 100, 75, 50, 25, 15, 10, 5, 3, or 1 mile from the location of use.

The microbe growth facilities can produce fresh, microbe-based compositions, comprising the microbes themselves, microbial metabolites, and/or other components of the medium in which the microbes are grown. If desired, the compositions can have a high density of vegetative cells or a mixture of vegetative cells, spores, conidia, mycelia and/or other microbial propagules. Advantageously, the compositions can be tailored for use at a specified location.

If desired, the methods of the subject invention can harness the power of naturally-occurring local microorganisms and their metabolic by-products to improve oil production, transmission and/or refining. Local microbes can be identified based on, for example, salt tolerance, ability to grow at high temperatures, and the use of genetic identification of the sequences described herein.

The microbe growth facilities provide manufacturing versatility by their ability to tailor the microbe-based products to improve synergies with destination geographies. The microbe growth facilities may operate off the grid by utilizing, for example, solar, wind and/or hydroelectric power. Thus, the microbe-based compositions can be produced in remote locations. In some embodiments, however, the microbe growth facilities produce the products at a different location, and package the product in such a way as to allow for transporting the product to the oil well.

The growth vessel used for growing microorganisms can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the method comprises growing the microorganisms in a nutrient medium. In one embodiment, the nutrient medium comprises a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The nutrient medium can further comprise a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, isopropyl, propanol, butanol, pentanol, hexanol, isobutanol, and/or glycerol; fats and oils such as soybean oil, rice bran oil, canola oil, olive oil, corn oil, sesame oil, and/or linseed oil; etc. These carbon sources may be used independently or in a combination of two or more.

In one embodiment, the method comprises use of two carbon sources, one of which is a saturated oil selected from canola, soy, sunflower, vegetable, corn, coconut, olive, or any other oil suitable for use in, for example, cooking.

In one embodiment, the microorganisms can be grown on a solid or semi-solid substrate, such as, for example, corn, wheat, soybean, chickpeas, beans, oatmeal, pasta, rice, and/or flours or meals of any of these or other similar substances.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms.

In one embodiment, inorganic salts may also be included in the nutrient medium. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, sodium chloride and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam during cultivation.

The method can provide oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of the liquid, and air spargers for supplying bubbles of gas to the liquid for dissolution of oxygen into the liquid.

The pH of the fermentation medium should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

The biomass content of the fermentation medium may be, for example from 5 g/l to 180 g/l or more, or from 10 g/l to 150 g/l or more.

The microbial growth by-product of interest may be retained in the microorganisms or secreted into the growth medium. In another embodiment, the method for producing microbial growth by-product may further comprise steps of concentrating and purifying the microbial growth by-product of interest. In a further embodiment, the medium may contain compounds that stabilize the activity of microbial growth by-product.

The method for cultivation of microorganisms and production of the microbial by-products can be performed in a batch, quasi-continuous, or continuous processes.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a microbe-free medium or contain cells, spores, mycelia, conidia or other microbial propagules. In this manner, a quasi-continuous system is created.

Advantageously, the methods of cultivation do not require complicated equipment or high energy consumption. The microorganisms of interest can be cultivated at small or large scale on site and utilized, even being still-mixed with their media. Similarly, the microbial metabolites can also be produced, extracted and/or purified in large quantities at the site of need.

Because, in certain embodiments, the microbe-based products can be generated locally, without resort to the microorganism stabilization, preservation, storage and transportation processes of conventional microbial production, a much higher density of live microbes, spores, mycelia, conidia or other microbial propagules can be generated, thereby requiring a smaller volume of the microbe-based product for use in the on-site application or which allows much higher density microbial applications where necessary to achieve the desired efficacy. This allows for a scaled-down bioreactor (e.g., smaller fermentation tank, smaller supplies of starter material, nutrients and pH control agents), which makes the system efficient. Local generation of the microbe-based product also facilitates the inclusion of the growth medium in the product. The medium can contain agents produced during the fermentation that are particularly well-suited for local use.

Advantageously, local microbe growth facilities provide a solution to the current problem of relying on far-flung industrial-sized producers whose product quality suffers due to upstream processing delays, supply chain bottlenecks, improper storage, and other contingencies that inhibit the timely delivery and application of a viable product.

Local production and delivery within, for example, 24 hours of fermentation results in stable compositions and substantially lower shipping costs. Given the prospects for rapid advancement in the development of more effective and powerful microbial products, consumers will benefit greatly from this ability to rapidly deliver the products.

The microorganisms useful according to the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganism is any yeast or fungus. Examples of yeast and fungus species suitable for use according to the current invention, include, but are not limited to, *Acaulospora, Aspergillus, Aureobasidium* (e.g., *A. pullulans*), *Blakeslea, Candida* (e.g., *C. albicans, C. apicola*), *Cryptococcus, Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Meyerozyma* (e.g., M guilliermondii), Penicillium, Phythium, Phycomyces, Pichia* (e.g., *P. anomala, P. guielliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T virens*), *Ustilago* (e.g., *U. maydis*), *Wickerhamomyces* (e.g., *W. anomalus*), *Williopsis*, and *Zygosaccharomyces* (e.g., *Z. bailii*).

In certain embodiments, use of a yeast fermentation product according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (an emulsifier) in yeast cell walls. Additionally, the yeast fermentation product further can comprise surfactants in the culture, which are capable of reducing both surface and interfacial tension, as well as other metabolites (e.g., lactic acid, ethyl acetate, ethanol, etc.) in the culture.

In some embodiments, the microorganisms are bacteria, including Gram-positive and Gram-negative bacteria. Bacteria suitable for use according to the present invention include, for example, *Acinetobacter* (e.g., *A. calcoaceticus, A. venetianus*); *Agrobacterium* (e.g., *A. radiobacter*), *Azotobacter* (*A. vinelandii, A. chroococcum*), *Azospirillum* (e.g., *A. brasiliensis*), *Bacillus* (e.g., *B. anyloliquefaciens, B. firmus, B. laterosporus, B. licheniformis, B. megaterium, B. mucilaginosus, B. subtilis*), *Chlorobiaceae* spp., *Dyadobacter fermenters, Frankia* spp., *Frateuria* (e.g., *F. aurantia*), *Klebsiella* spp., *Microbacterium* (e.g., *M. laevanornans*), *Pantoea* (e.g., *P. agglomerans*), *Pseudomonas* (e.g., *P. aeruginosa, P. chlororaphis, P. chlororaphis* subsp. *aureofaciens* (Kluyver), *P. putida*), *Rhizobium* spp., *Rhodospirillum* (e.g., *R. rubrum*), *Sphingomonas* (e.g., *S. paucimobilis*), and/or *Xanthomonas* spp.

Other microbial strains can be used in accordance with the subject invention, including, for example, any other microbial strains having high concentrations of mannoprotein and/or beta-glucan in their cell walls and/or that are capable of producing surfactants.

Preparation of Microbe-Based Products

In certain preferred embodiments, the compositions of the subject invention utilize biochemicals produced by microorganisms. These growth by-products can be used in a purified or crude form. In a specific embodiment, the growth by-products are surfactants.

One microbe-based product of the subject invention is simply the fermentation medium containing the microorganism and/or the biosurfactants produced by the microorganism and/or any residual nutrients or other growth by-products. The product of fermentation may be used directly without extraction or purification. If desired, extraction and purification can be easily achieved using standard extraction and/or purification methods or techniques described in the literature.

The microorganisms in the microbe-based product may be in an active or inactive form. The microbe-based products may be used without further stabilization, preservation, and storage. Advantageously, direct usage of these microbe-based products reduces the possibility of contamination from foreign agents and undesirable microorganisms, and maintains the activity of the by-products of microbial growth.

The microbes and/or medium (e.g., broth or solid substrate) resulting from the microbial growth can be removed from the growth vessel and transferred via, for example, piping for immediate use.

In one embodiment, the microbe-based product is simply the growth by-products of the microorganism. For example, biosurfactants produced by a microorganism can be collected from a submerged fermentation vessel in crude form, comprising, for example about 0.001% to about 99% pure biosurfactant in liquid broth. The biosurfactant can be further purified, if desired.

In other embodiments, the microbe-based product (microbes, medium, or microbes and medium) can be placed in containers of appropriate size, taking into consideration, for example, the intended use, the contemplated method of application, the size of the fermentation vessel, and any mode of transportation from microbe growth facility to the location of use. Thus, the containers into which the microbe-based composition is placed may be, for example, from 1 gallon to 1,000 gallons or more. In other embodiments the containers are 2 gallons, 5 gallons, 25 gallons, or larger.

Upon harvesting, further components can be added to the microbe-based product as the harvested product is placed into containers and/or piped (or otherwise transported for use). The additives can be, for example, buffers, carriers, other microbe-based compositions produced at the same or different facility, viscosity modifiers, lubricants, surfactants, emulsifying agents, preservatives, nutrients for microbe growth, tracking agents, solvents, biocides, solubility controlling agents, pH adjusting agents, stabilizers, ultra-violet light resistant agents, and/or other microbes and other ingredients specific for an intended use.

In one embodiment, buffering agents can be included, such as, for example, organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

In one embodiment, additional components such as an aqueous preparation of a salt, such as sodium bicarbonate or carbonate, sodium sulfate, sodium phosphate, sodium biphosphate, can be included in the formulation.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 200 C, 15° C., 10° C., or 5° C. On the other hand, a biosurfactant composition can typically be stored at ambient temperatures.

Advantageously, in accordance with the subject invention, the microbe-based product may comprise medium in which the microbes were grown. The product may be, for example, at least, by weight, 1%, 5%, 10%, 25%, 50%, 75%, or 100% growth medium. The amount of biomass in the product, by weight, may be, for example, anywhere from 0% to 100% inclusive of all percentages therebetween.

Methods of Enhancing Oil Recovery

The subject invention provides efficient methods for improving oil production, wherein one or more concentrated acids one or more surfactants, one or more chelating agents, and one or more solvents are applied into an oil-bearing formation, an oil well and/or a wellbore. Optionally, one or more co-surfactants are also applied. In specific embodiments, the methods provide for enhanced acid washing and/or acidizing treatments, In one embodiment, the methods comprise applying a multipurpose EOR composition of the subject invention to the formation, oil well and/or wellbore. Advantageously, the subject invention can utilize one treatment to perform a variety of functions, in addition to EOR, including improving the quality of crude fluids, and maintenance of oil production and processing equipment. In some embodiments, these functions are interrelated. This invention is particularly useful in vertical wells, but can also be used to enhance oil recovery in horizontal wells as well as from wells that have experienced a decline in oil production rates, including depleted stripper (marginal) wells.

As used herein, "applying" a composition or product refers to contacting it with a target or site such that the composition or product can have an effect on that target or site. The effect can be due to, for example, the action of an acid, surfactant, chelator, solvent and/or a synergistic combination thereof. For example, the compositions can be injected into oil wells and/or the piping, tubulars, wellbore, casing, annulus, pumps, and tanks associated with oil-bearing formations, oil wells, oil production, oil transmission and oil transportation.

In an exemplary embodiment, the methods comprise pumping, for example, 100 to 1,000 gallons per foot of formation of the composition into and out of an oil well. Injection rates can be determined by a skilled oil well operation, although, as an example, an injection rate of 1 to 20 gallons per minute, or 1 to 20 barrels per minute can be used in some embodiments. In preferred embodiments, no shut-in time is required.

Application of the multipurpose FOR composition can be performed during drilling operations (e.g., while drilling, while tripping-in or tripping-out of the hole, while circulating mud, while casing, while placing a production liner, and/or while cementing, etc.). Application can also occur as a production treatment, for example, by introducing the composition into an oil well after oil production is underway and/or after a decline in the rate of oil production from the formation has occurred.

In some embodiments, the composition can be introduced into the formation through perforations in the casing. The composition may be forced into the surrounding formation by applied pressure or, if the composition is allowed to set at the bottom of the casing, the composition may seep into the formation without additional pressure. The composition permeates the formation, improving the rate of oil recovery by a number of mechanisms such as, for example, dissolving contaminant blockages in the formation pore throats.

The composition may be introduced by means of injection pumps into off-shore gas or oil wells to reduce contaminants in well casings and transmission lines. In addition to the problems associated with land oil wells, the lines and contents between the bottom of the ocean and the platform associated with off-shore wells are cooled by the ocean or sea water, thus increasing the crystallization and deposition rate of scale, paraffin and asphaltene. To treat the lines, from 1-500 gallons up to 1000 barrels, 10,000 barrels, or more, for example, of the composition can be introduced therein.

The subject treatment can be effective in a range of different geologic formations. For example, the subject invention can be useful in formations as deep as about 7,000 feet or deeper, and as shallow as about 1,500 feet or shallower. Additionally, the invention can be useful in formations having a range of porosity and/or permeability, for example from about 0.1% to about 20% or more. The invention can also be useful in formations having a wide range of temperatures, pH, and salinity.

In some embodiments, the methods result in FOR through, for example, stimulation of the flow of oil from an oil well; prevention and/or reduction of asphaltene agglomeration in oil and/or deposition on equipment surfaces; dispersal of paraffin deposits; increase in the mobility of crude oil during recovery; and increase in the wettability of formation rock.

Furthermore, in some embodiments, the concentrated acid works in synergy with the one or more surfactants, one or more chelating agents, one or more solvents, and/or one or more optional co-surfactants, to dissolve and/or disperse mineral scale deposits that have deposited in, for example, tubulars, in the wellbore, and/or that have plugged rock pore throats in a formation. In certain embodiments, this synergy provides for enhanced acid treatments, meaning the treatment is more effective for stimulating the flow of oil from a formation than using concentrated acids alone.

Advantageously, the subject methods can free clogged reservoir pores, channels and/or tubing, and/or reduce the capillary pressure—a major factor controlling the fluid distribution in a reservoir rock. Capillary pressure is observable in the presence of two immiscible fluids in contact with each other in capillary-like tubes. The small pores in a reservoir rock are similar to capillary tubes and they usually contain two immiscible fluid phases in contact with each other. Unblocking clogged pores and decreasing the capillary pressure allows for increased oil production from depleted wells, and further, even allowing inoperable wells to resume normal operation.

In one embodiment, the methods can also be used for improving the quality of crude oil recovered from a formation. Improved crude oil quality can be achieved through, for example, the sequestration and/or removal of heavy metals, such as nickel and/or vanadium, present in the oil; reduction and/or prevention of asphaltene agglomerates in the oil; and modulation (increase or decrease) in the acidity of the oil and other formation fluids.

In certain embodiments, the methods can also be used for maintenance of equipment, for example, pipes, tubulars, drills, pumps, casings, tanks, rods, boreholes, and other structures and equipment involved in oil and/or gas production and processing. In some embodiments, the composition may be applied directly to equipment. For example, prior to placing rods and casings into gas and/or oil wells, these parts may be sprayed with, or soaked in, the composition. The parts may be dipped into tanks filled with the composition to prevent under-deposit corrosion and buildup of contaminants.

Any equipment or component of oil production, processing, transportation, storage and/or refining can be treated and maintained with a composition of the subject invention. Advantageously, the subject invention can be applied to equipment involved in all stages of the chain of operations, including exploration and production (E&P) (e.g., onshore and offshore wellbores, flowlines, and tanks), midstream (e.g., pipelines, tankers, transportation, storage tanks), and in refineries (e.g., heat exchangers, furnaces, distillation towers, cokers, hydrocrackers).

In one embodiment, maintenance of equipment is achieved through the prevention, removal, and/or dispersal of contaminating deposits that form on the equipment. There are many types of contaminants associated with oil production equipment, such as scales, oils, paraffins, asphalts/asphaltenes, resins, sulfur, tar by-products, biofilms, and other viscous materials. The composition of the present invention can be used to remove any one or more of the contaminants associated with oil recovery, transmission and processing. In certain specific embodiments, the contaminant is scale.

In one embodiment, the subject invention can be used for preventing precipitation and/or deposition of contaminants from occurring. Thus, the present invention allows for delaying or completely removing the necessity for preventative maintenance related to removing precipitates and deposits, as well as the need for replacing or repairing equipment parts.

In one embodiment, a method of cleaning and maintaining a working well, including the surrounding formation, includes the steps of pouring or injecting the composition down the casing side (back lines) of a well and allowing it to mix with the fluid that is already in the well. When enough fluid is present, the composition can then optionally be circulated by, for example, a pump for 24-72 hours, preferably 48-72 hours. Prior to circulating, the composition may be allowed to set for 8 to 24 hours, for example. The setting time, circulating time and dosage depend on the amount of scale and/or other contaminant anticipated to be present, as well as the depth and size of the well. A basic initial dosage can be, but is not limited to, 20 gallons of composition and for maintaining a clear structure, at least about 5 gallons of composition per well on periodic basis, e.g. biweekly, monthly, bimonthly.

The subject composition can further be applied for dissolving and dispersal of contaminant buildup in, for example, storage and transportation tanks, tankers, ships, trucks, pipelines and flowlines, without need for mechanical cleaning solutions or toxic solvents. Methods of cleaning tanks are provided, which can be effective for dispersing contaminant buildup in a matter of days, for example, less than a week.

In one embodiment, methods of cleaning a storage or transportation tank are provided, wherein air or methane is injected under pressure into a tank. This can either be preceded by or followed by injection of the subject descaling composition. Waste water is pumped to a treatment plant after treatment with the subject composition. Preferably, the air or methane is injected into the tank to allow for approximately 10 minutes of roiling.

Advantageously, in some embodiments, the subject treatments can free clogged pores, channels and/or tubing, allowing for increased oil production from depleted wells, and further, even allowing inoperable wells to resume normal operation. Additionally, through a variety of mechanisms, the subject treatments can stimulate wells, improve the quality of crude oil, and help in the maintenance of oil production and processing equipment.

We claim:

1. A method for enhancing oil recovery from an oil-bearing formation, the method comprising introducing a composition comprising:
   water,
   1% to 20% v/v of hydrochloric acid, hydrofluoric acid, or an organic acid,
   5 to 10 ml/L glycolipid biosurfactant comprising a mannosylerythritol lipid, a sophorolipid, or a mixture thereof,
   2 to 4 ml/L isopropyl alcohol, and
   a chelating agent comprising sodium citrate, citric acid, EDTA, or a mixture thereof,
   into the formation, or into an oil well or wellbore associated with the formation.

2. The method of claim 1, wherein the recovery of oil is enhanced by one or more of the following:
   stimulation of the oil's flow from the subterranean formation;
   dissolving or dispersing scale and paraffin deposits that have plugged rock pore throats in the formation;
   preventing or reducing asphaltene deposition on surfaces of equipment associated with the formation;
   increasing the oil's mobility during recovery; and
   increasing the formation's wettability.

3. The method of claim 1, wherein, in addition to enhancing oil recovery, the method improves the quality of recovered oil by reducing or preventing asphaltene agglomerates in the oil.

4. The method of claim 1,
   wherein the chelating agent is a mixture comprising 5 to 10 g/L sodium citrate, 5 to 10 g/L citric acid, and 5 to 10 g/L EDTA.

5. A method for enhancing oil recovery from an oil-bearing formation, which comprises introducing into the formation, or into an oil well or wellbore associated with the formation, a composition comprising:
   water,
   1% to 20% v/v of hydrochloric acid,
   5 to 10 ml/L glycolipid biosurfactant,
   2 to 4 ml/L isopropyl alcohol, and
   a chelating mixture comprising 5 to 10 g/L sodium citrate, 5 to 10 g/L citric acid, and 5 to 10 g/L EDTA.

* * * * *